INVENTOR.
JOSEPH N. CRAVER, JR.

ATTORNEY

United States Patent Office 3,230,126
Patented Jan. 18, 1966

3,230,126
METHOD FOR FORMING A CLEAR GLOSSY LAMINATE OF POLYETHYLENE FILM AND REGENERATED CELLULOSE FILM HAVING A MOISTURE-PROOF COATING ON ITS SURFACE REMOTE FROM THE POLYETHYLENE FILM
Joseph N. Craver, Jr., Park Forest, Ill., assignor to Union Carbide Corporation, a corporation of New York
Filed June 14, 1960, Ser. No. 35,950
3 Claims. (Cl. 156—244)

This invention relates to a method for forming a clear laminate of polyethylene film and regenerated cellulose film. More particularly, this invention relates to a laminate formed of polyethylene bonded to regenerated cellulose film having a moisture-proof coating on its surface remote from the polyethylene film.

Polyethylene film is generally applied to moisture-proof coated regenerated cellulose film by the extrusion coating process. In such process, polyethylene is melt-extruded downwardly from a slot-type die in film form. The die is ordinarily positioned above and in alignment with laminating means. Such means include a pair of counter-rotating rolls; one being a rubber pressure roll and the other being a chilled metal roll. The regenerated cellulose film having a moisture-proof coating on one of its surfaces is fed from an external source over the rubber roll with the moisture-proof coating in direct contact with the peripheral surface of the rubber roll. At the nip of the laminating rolls the molten polyethylene film is applied to the uncoated surface of the regenerated cellulose film. Here the bond or adhesion between the two films is produced and the resultant laminate is then passed around an arc of the chilled metal roll for solidifying the polyethylene film, it being in direct contact with the metal roll.

Although the described process produces a satisfactory bond between the two films, it impairs the optical clarity of the laminate. Varying the temperature of the molten polyethylene, changing the nip pressure to improve the bonding and flow of the polyethylene film, or improving the surface characteristics of the roll which contacts the polyethylene film have not produced an optically clear laminate.

The haziness or lack of clarity of the laminate appears to result from imprints or impressions imparted to the moisture-proof coating on the regenerated cellulose film by its contact with the peripheral surface of the rubber roll. Such impressions or imprints are believed to be caused by heat dissipated by the molten polyethylene film at the nip which softens the moisture-proof coating and makes it liable to impressions from irregularities in the peripheral surface of the rubber roll. Attempts to make the rubber roll without these surface irregularities have not met with success. Additionally, the softness of the rubber roll renders its peripheral surface susceptible to damage during normal operating conditions which, of course, results in further surface irregularities.

Accordingly, it is an object of this invention to form a clear laminate of polyethylene film and regenerated cellulose film having a moisture-proof coating on its surface remote from the polyethylene film.

Another object of this invention is to prevent the peripheral surface of the rubber roll from making impressions or imprints in the moisture-proof coating of the regenerated cellulose film.

Other and additional objects will become apparent hereinafter.

According to the present invention, a clear laminate of polyethylene film and regenerated cellulose film having a moisture-proof coating on its surface remote from the polyethylene film is formed by continuously melt-extruding the polyethylene film and pressure applying the molten polyethylene film to the uncoated surface of the regenerated cellulose film by concurrently passing the two films between a chilled, smooth, unyielding surface and a smooth, resiliently supported surface. During such passage the polyethylene film is pressure contacted by the chilled, unyielding surface and the moisture-proof coating of the regenerated cellulose film is simultaneously pressure contacted by the smooth, resiliently supported surface. Such smooth, resiliently supported surface will not transfer impressions or imprints to the moisture-proof coating of the regenerated cellulose film, and is made from a member selected from the group including polymeric films made from material such as polytetrafluoroethylene; polyethylene terephthalate; non-fibrous films made from materials such as regenerated cellulose; and flexible metal sheets.

Characteristic of the members comprising this group is that they prevent the resilient support from contacting and transferring impressions to the moisture-proof coating. Moreover, such members do not transfer impressions to the moisture-proof coating. Still further, these members are not adversely affected by the heat dissipated by the molten polyethylene film and are not adversely affected by the laminating pressure means.

In a preferred embodiment of the invention, the pressure applying or laminating means includes a pair of counter-rotating rolls; one being a rubber pressure roll and the other being a chilled metal roll. To prevent the surface irregularities of the rubber pressure roll from causing imprints or impressions in the moisture-proof coating of the regenerated cellulose film, as herein before discussed, the laminating means includes a thin flexible layer of material which is maintained over and in contact with at least that portion of the rubber pressure roll which can deleteriously affect the moisture-proof coating. The surface of the layer of material which contacts the moisture-proof coating is smooth or polished so that it will not transfer imprints or impressions thereto. Additionally, the material selected for the thin flexible layer is not deleteriously affected by the heat dissipated from the molten polyethylene film and is not adversely affected by the laminating pressure of the rolls.

The term "moisture-proof" coating is used herein to define well known coatings which have helped make regenerated cellulose commercial by lowering its otherwise high moisture permeability. Generally, the moisture-proof coating primarily consists of nitro-cellulose and hydrocarbon wax.

The nature of the invention and the manner in which the invention may be practiced will become clear from the detailed description when taken in conjunction with the accompanying drawings forming a part of the specification and wherein.

Figure 1:
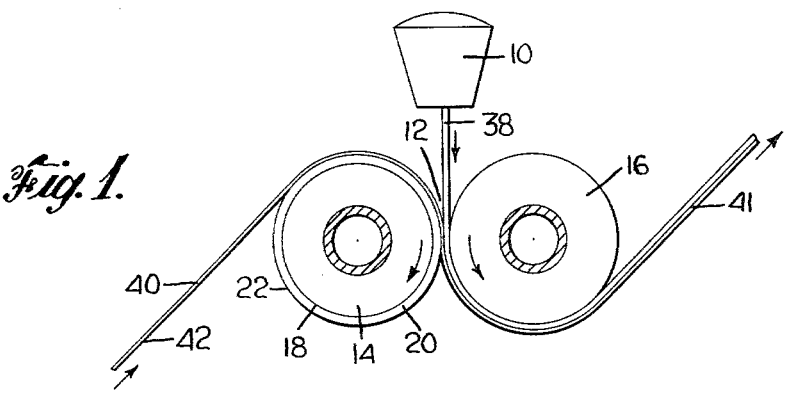
FIGURE 1 is a side elevation, partly in section, schematically illustrating one form of the invention.

Referring now to the drawing, wherein like numerals designate like parts except as otherwise indicated, the reference numeral 10 designates a slot-type die spaced above and in alignment with the nip 12 of a pair of counter-rotating rolls 14 and 16. The rolls 14 and 16 are suitably mounted to apply a controllable pressure on the films passing through the nip 12 by means well known to those skilled in the art.

The roll 16 is rigid preferably being made of metal. The peripheral surface of the metal 16 is smooth to prevent the polyethylene film from adhering to it and to prevent marking of such film. Additionally, the roll 16 is chilled, such as by circulating cooled water therethrough, for solidifying the polyethylene film, as hereinafter more fully set forth.

The roll 14 is made of resilient rubber. Illustrative of the types of rubber which can be used include natural, hycar, butyl, silicone elastomer and Buna N. In general, when the roll 14 is made from any one of these materials its peripheral surface 18 has irregularities therein. Such surface irregularities are believed to result from the nature of the compressible material in that the desired smoothness cannot be obtained in the finished roll. Additionally, the softness of the compressible material renders its surface 18 susceptible to damage under normal operation which also produces the undesirable surface irregularities.

Referring now to the several embodiments of the invention, a thin layer of smooth flexible material is maintained in contact with at least that portion of the peripheral surface 18 of the rubber pressure roll 14 which can deleteriously affect the clarity of the laminate. Such thin layer of material prevents the roll 14 from transferring impressions or imprints to the moisture-proof coating of the regenerated cellulose film and, because of its smoothness, it will not transfer impressions or imprints to such coating.

In the embodiment of the invention shown in FIGURE 1, the thin flexible layer of material encircles the peripheral surface 18 of the rubber roll 14 and is in intimate contact therewith. Accordingly, in this embodiment of the invention such layer of material can be a sleeve or a coating 20. If the thin layer of material is a sleeve, it is shrink-fitted over the roll 14 so that there can be no relative motion therebetweeen. If in the form of a coating, it is uniformly applied about the roll 14 in any well known manner. Whether a sleeve or a coating 20 encircles the roll 14 the surface 22 thereof is smooth or polished and will not make impressions or imprints in the moisture-proof coating of the regenerated cellulose film.

Figure 2:
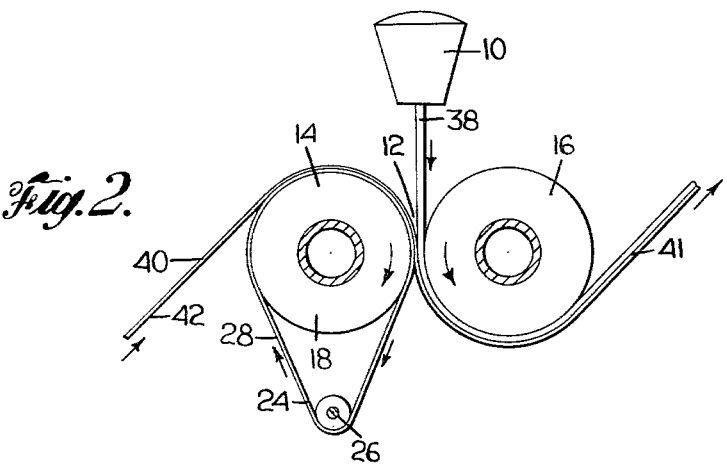
FIGURE 2 is a side elevation, partly in section, schematically illustrating another form of the invention.

In the embodiment of the invention shown in FIGURE 2, the thin flexible layer of material is an endless belt 24 which snuggly fits over the upper portion of the rubber roll 14 and the lower portion of a guide roll 26 spaced below and in alignment with the roll 14. The diameter of the guide roll 26 is substantially smaller than the diameter of the rubber roll 14 such that the belt 24 is in frictional contact with the roll 14 for greater than one-half of the circumference thereof. Because of this frictional contact, the roll 14 drives the endless belt 24 without relative motion therebetween. The surface 28 of the endless belt 24 not in contact with roll 14 is smooth or polished for preventing deleterious effects to the clarity of the laminate by virtue of the contact between such surface 28 and the moisture-proof coating of the regenerated cellulose film.

Figure 3:
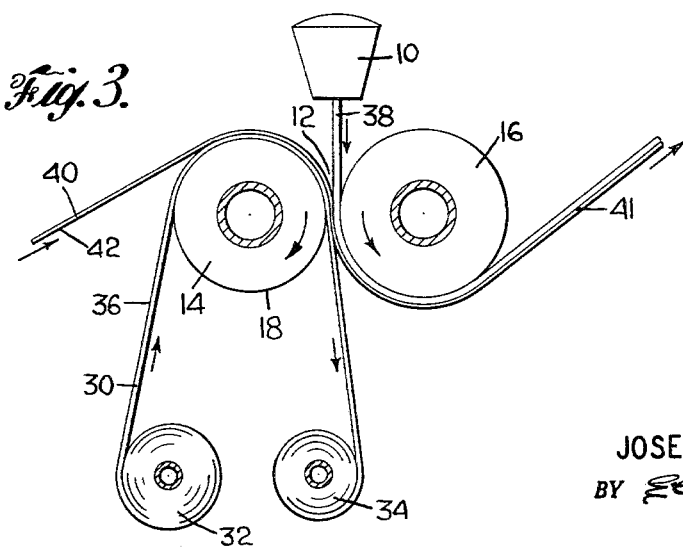
FIGURE 3 is a side elevation, partly in section, schematically illustrating still another form of the invention.

In the embodiment shown in FIGURE 3, the flat thin flexible layer of material is a backing sheet 30. The sheet 30 is unwound from a roll 32 passed over and in frictional contact with the upper portion of the roll 14 and then wound on a roll 34. The rolls 32 and 34 are spaced below and on opposite sides of the center of the roll 14. The roll 14 drives the backing sheet 30 from one roll to the other without relative motion therebetween because of the frictional contact between the roll 14 and the sheet 30.

As in the other disclosed embodiments of the invention, the backing sheet 30 prevents the roll 14 from deleteriously affecting the clarity of the laminate. Also, the backing sheet 30 itself does not deleteriously affect the clarity of the laminate because the surface 36 thereof is smooth or polished. As a result, the moisture-proof coating of the regenerated cellulose film does not receive impressions from the planar surface 36 when in contact therewith.

In forming a clear laminate 41 of polyethylene film 38 and a regenerated cellulose film 40 having a moisture-proof coating 42 on its surface remote from the polyethylene film any one of the embodiments shown in the drawing can be employed. In such embodiments of the invention, the regenerated cellulose film 40 is fed from an external source over the rubber roll 14 to the nip 12 with the moisture-proof coating 42 of such film 40 in direct contact with the surface of the thin, smooth layer of flexible material remote from the roll 14 for the entire arc it travels about the roll 14 including the nip 12. The thin, smooth layer of flexible material can be in the form of the coating or sleeve 20 or the endless belt 24 or the backing sheet 30, and correspondingly, the surface can be the surface 22 or 28 or 36, respectively. In any event, such layer of material prevents the rubber roll 14 from transferring irregularties to the moisture-proof coating. Moreover, the surface of the layer of material in contact with the moisture-proof coating does not transfer impressions thereto. Thus, the moisture-proof coated regenerated cellulose film is fed to the nip 12 with its clarity unimpaired.

Concurrently, polyethylene is melt-extruded downwardly from the die 10 in film form. At the nip 12, the polyethylene film 38 is applied to the other or uncoated planar surface of the regenerated cellulose film 40. Here the bond or adhesion of the films 38 and 40 is produced. With the polyethylene film 38 in peripheral contact with the chilled metal roll 16, the resultant laminate 41 is then passed around an arc thereof for solidifying the polyethylene film 38.

The sleeve or coating 20, endless belt 24 and backing sheet 30 can be made from a member selected from the group including polymeric films made from materials such as polytetrafluoroethylene, polyethylene terephthalate, nonfibrous films made from materials such as regenerated cellulose; and flexible metal sheets. Characteristic of the members 20, 24 and 30 made from such materials is that their surfaces 22, 28 and 36, respectively, are smooth or can be made smooth by polishing. Additionally, because of the melting point of the above mentioned material and the fact that much of the heat from the molten polyethylene film 38 has been dissipated by the time it contacts the members 20, 24 and 30, they are not adversely affected by the molten condition of the polyethylene film 38 at the nip 12. Also, the members 20, 24 and 30 are not adversely affected by the pressure applied thereto by the rolls 14 and 16 at the nip 12. Still further, the thickness of the members 20, 24 and 30 is selected to be at least sufficient to prevent fatigue thereof.

Preferably, the polyethylene film 38 is made from film-forming ethylene polymeric having a density of 0.93 or less.

The polyethylene film 38 need not be self supporting and its thickness can be varied by correlating the thickness of the molten material being extruded through the die opening; the relative travel rate of the film 38 and 40 and the pressure obtained in the nip 12 of the counter-rotating rolls 14 and 16. Desirably, the polyethylene film 38 of the resultant laminate 41 is relatively thin having a thickness from about 0.2 mil to about 10 mils.

Although the polyethylene film 38 need not be self supporting the regenerated cellulose film is self supporting with thicknesses of 1 mil and 2 mils having been found satisfactory. The moisture-proof coating 42 on the regenerated cellulose film can be 0.1 mil or greater in thickness. A typical moisture-proof coating generally includes nitrocellulose, plasticizer, rosen and hydrocarbon wax. Such moisture-proof coatings are well known and for a more detailed discussion see volume 44 of Industrial and Engineering Chemistry 2514 through 2524, and the book entitled, "Cellulosics" which was published by Reinhold Publishing Corporation.

The details and manner of practicing this invention will become apparent by reference to the following specific examples; it being understood that these examples are merely embodiments of the invention and that the scope of the invention is not limited thereto.

*Example I*

A continuous laminate of polyethylene film and a regenerated cellulose film having a moisture-proof coating on its surface remote from the polyethylene film was formed using apparatus as illustrated in FIGURE 1 of the drawing. The polyethylene had a melt index of 3.0 and a density of 0.918. The die 10 was at a temperature of about 600° F. and downwardly melt-extruded polyethylene in film form having a thickness of about 20 mils. The roll 16 was made of metal having a smooth peripheral surface and was maintained at a temperature of about 116° F. The roll 14 was made or rubber having a "Durometer" hardness of 95 and its peripheral surface 18 had surface irregularities therein. The thin flexible layer of material was a sleeve 20 consisting of polytrifluoromonochloroethylene. The planar surface 22 of said sleeve 20 was smooth. The regenerated cellulose film 40 having a moisture-proof coating on one surface thereof was fed from an external supply over the sleeve covered rubber roll 14 to the nip 12; the moisture-proof coating 42 being in direct contact with the surface 22 of the sleeve 20 throughout the entire arc it traveled about the roll 14. At the nip 12 of the rolls 14 and 16, the molten polyethylene film was applied to the uncoated surface of the regenerated cellulose film. Here the bond between the films 38 and 40 was produced by the rolls 14 and 16 which exerted a laminating pressure thereagainst of 20 pounds per lineal inch at the nip. The resultant laminate 41 was withdrawn from the nip 12 at the rate of 50 feet per minute and then run around an arc of the chilled metal roll 16 with the polyethylene film 38 in peripheral contact therewith for the solidifying of it. Thereafter, the clarity of the laminate was measured by the test procedure ASTM D1003–52. Such laminate had a total haze value of 7.5.

*Example II*

The procedure set forth in Example I was repeated except that the thin layer of flexible material was a backing sheet 30 as illustrated in FIGURE 3. The backing sheet 30 consisted of a self-sustaining film of regenerated cellulose. The clarity of the resultant laminate 41 was measured by test procedure ASTM D1003–52. The total haze value of such laminate was 6.3.

For purposes of comparison, a laminate was also formed by the procedure set forth in Example I except that the moisture-proof coating of the regenerated cellulose film 40 was fed over the rubber roll 14 in direct contact with its rough peripheral surface 18. The clarity of the resultant laminate was measured by test procedure ATSM D1003–52. The total haze value of the laminate was 25.4.

Thus, the Examples I and II dramatically illustrate the significant increase in the clarity of the laminates formed by the practice of this invention over the clarity of a laminate formed without the benefit of this invention.

A clear laminate of polyethylene film and regenerated cellulose film having a moisture-proof coating on its surface remote from the polyethylene film formed by the practice of this invention can be used extensively for food packaging. The polyethylene film and moisture-proof coating serve as excellent moisture-proof barriers while the regenerated cellulose film is highly resistant to the action of oily materials and is an excellent barrier to many gases. Also, due to the heat sealing properties of polyethylene, the laminate can be readily heat sealed to form heat seals characterized by their strength. Additionally, the clear laminate is transparent so that the packaged contents therein can be readily seen.

While it is preferred to form a clear glossy laminate including a coating of either low density, medium density or high density polyethylene, other polyolefins including polypropylene, polyisobutylene, and copolymers thereof can also be employed.

Since it is obvious that various changes and modifications may be made in the described method and apparatus without departing from the nature and spirit thereof, it is to be understood that the invention is not limited thereto except as set out in the appended claims.

What is claimed is:

1. In a process for forming a clear laminate of polyethylene film and regenerated cellulose film having only one of its surfaces coated with a moisture-proof coating, the steps which comprise melt-extruding polyethylene in film form, and pressure applying the molten polyethylene film to the uncoated surface of the regenerated cellulose film by concurrently passing the polyethylene film and the regenerated cellulose film between a smooth, unyielding surface which pressure contacts the surface of the polyethylene film remote from the regenerated cellulose film and a resiliently supported member having a smooth surface which pressure contacts the moisture-proof coating of the regenerated cellulose film without transferring impressions thereto, said resiliently supported member being in the form of an endless moving belt and being made from a member selected from the group consisting of polyethylene terephthalate, and flexible metal.

2. In a process for forming a clear laminate of polyethylene film and regenerated cellulose film having only one of its surfaces coated with a moisture-proof coating, the steps of rotating a pair of counter-rotating pressure rolls; one of which is a rubber pressure roll and the other of which is a chilled metal roll, maintaining a smooth surfaced layer of material in contact with at least that portion of the peripheral surface of the rubber roll capable of contacting the moisture-proof coating of the regenerated cellulose film to maintain the clarity of said moisture-proof coating, said smoothed surfaced layer of material being thin flexible and made from a member selected from the group consisting of polyethylene terephthalate, and flexible metal; feeding the regenerated cellulose film over the rubber roll and through the nip of the counter-rotating rolls with the moisture-proof coating in direct contact with the smooth surface of the layer of material; melt-extruding polyethylene in film form and pressure applying one surface of the molten polyethylene film to the uncoated surface of the regenerated cellulose film at the nip of the counter-rotating rolls with the other surface of the polyethylene film contacting the chilled metal roll.

3. In a process for forming a clear laminate of polyolefin film and regenerated cellulose film having only one of its surfaces coated with a moisture-proof coating, the steps which comprise melt-extruding a polyolefin in film form, and pressure applying the molten polyolefin film to the uncoated surface of the regenerated cellulose film by concurrently passing the polyolefin film and the regenerated cellulose film between a smooth, unyielding surface which pressure contacts the surface of the polyolefin film remote from the regenerated cellulose film and a resiliently supported member having a smooth surface which pressure contacts the moisture-proof coating of the regenerated cellulose film without transferring impression thereto, said resiliently supported member being in the form of an endless moving belt and being made from a member selected from the group consisting of polyethylene terephthalate and flexible metal.

References Cited by the Examiner

UNITED STATES PATENTS

| | | | |
|---|---|---|---|
| 2,726,171 | 12/1955 | Morf et al. | 117—76 |
| 2,823,141 | 2/1958 | Hagan et al. | 117—76 |
| 2,944,586 | 7/1960 | Yanulis | 117—4 |
| 2,945,261 | 7/1960 | Aykanian et al. | 154—102 |
| 2,955,970 | 10/1960 | Rice et al. | 117—64 |

FOREIGN PATENTS 573,067   3/1959   Canada.

OTHER REFERENCES

"Polyethylene Extrusion Coatings," Arbit et al., a publication of the Bakelite Company, Division of Union Carbide Corp., 30 East 42nd St., N.Y. 17, N.Y., reprinted from Modern Packaging, April 1957, pp. 142–150, 204 and 208.

EARL M. BERGERT, *Primary Examiner.*

RICHARD D. NEVIUS, *Examiner.*